United States Patent
Park et al.

(10) Patent No.: US 8,467,572 B2
(45) Date of Patent: Jun. 18, 2013

(54) METHOD AND APPARATUS FOR DETECTING OBJECT USING PERSPECTIVE PLANE

(75) Inventors: Young Kyung Park, Seoul (KR); Hyoung Hwa Yoon, Seoul (KR); Jae Shin Yu, Gyeonggi-do (KR); Sung Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 491 days.

(21) Appl. No.: 12/765,057

(22) Filed: Apr. 22, 2010

(65) Prior Publication Data

US 2011/0069865 A1   Mar. 24, 2011

(30) Foreign Application Priority Data

Sep. 18, 2009   (KR) .................. 10-2009-0088616

(51) Int. Cl.
*G06K 9/00*   (2006.01)
(52) U.S. Cl.
USPC .......................................................... 382/103

(58) Field of Classification Search
None
See application file for complete search history.

(56) References Cited

U.S. PATENT DOCUMENTS

| | | | | |
|---|---|---|---|---|
| 8,036,436 | B2 * | 10/2011 | Geiger et al. | 382/128 |
| 2007/0002141 | A1 * | 1/2007 | Lipton et al. | 348/155 |
| 2008/0181453 | A1 * | 7/2008 | Xu et al. | 382/103 |
| 2010/0322516 | A1 * | 12/2010 | Xu et al. | 382/173 |

\* cited by examiner

*Primary Examiner* — Claire X Wang
*Assistant Examiner* — Thomas A James
(74) *Attorney, Agent, or Firm* — Fish & Richardson P.C.

(57) ABSTRACT

A method and apparatus for detecting an object using a perspective plane are disclosed. The method includes determining a perspective plane for a background scene, and determining a moving object within the background scene based upon the determined perspective plane. By using a visual surveillance device and an apparatus for detecting objects, the method and apparatus for detecting an object using a perspective plane is capable of efficiently detecting objects and tracking the movements of the corresponding objects.

16 Claims, 10 Drawing Sheets time = T1 time = T2 > T1

METHOD AND APPARATUS FOR DETECTING OBJECT USING PERSPECTIVE PLANE

CROSS-REFERENCE TO RELATED APPLICATIONS

This application claims the benefit of the Korean Patent Application No. 10-2009-0088616, filed on Sep. 18, 2009, which is hereby incorporated by reference as if fully set forth herein.

BACKGROUND OF THE INVENTION

1. Field of the Invention

The present invention relates to a method and apparatus for detecting an object and, more particularly, to a method and apparatus for detecting a moving object by using a perspective plane.

2. Discussion of the Related Art

With the recent development in the image processing technology, various types of image processing devices are under research and development. Particularly, such image processing devices may include a function of detecting a moving object within the image. More specifically, a function of detecting a moving object within an image under surveillance by using a visual surveillance device and tracking and displaying the detected object is technically under development. For example, a closed-circuit television (CCTV) is the most typical and widely known and used visual surveillance device. Herein, the surveillance devices are used for diverse purposes, such as preventing crimes including theft and illegal trespassing and also protecting individual privacy.

However, in the related art surveillance device, a moving object is simply detected from the background scene without considering the characteristics of the scene requested for surveillance (hereinafter referred to as a 'background scene'). Therefore, the related art surveillance device is disadvantageous in that an optimal surveillance cannot be performed or provided.

The problems found in the related art surveillance device and the technical objects of the present invention will now be described in detail with reference to FIG. 1. As shown in FIG. 1, a road allowing vehicles 101a and 102a to pass through is shown as the background scene 10. Generally, a camera (not shown) obtaining the background scene of the visual surveillance device is positioned in a fixed location. Therefore, a perspective view may eventually exist between a close area and a distant area. For example, even when two vehicles 101a and 102a correspond to the same size, it is apparent that the size of each vehicle being filmed within the background scene may be displayed differently due to the perspective characteristic.

In case of the related art visual surveillance device, a minimum size of the object requested to be detected within the background scene is determined. Generally, the related art visual surveillance device performs a filtering process of disregarding any object smaller than the determined minimum size. As described above, the filtering process is efficient for preventing a system overload from occurring in case objects of all sizes are to be detected within the background scene.

In case the perspective becomes deeper due to the characteristics of the background scene, if the size of an object shown at a very far distance is smaller than the predetermined minimum size, the related art visual surveillance device may not be able to properly detect corresponding object. For example, as shown in FIG. 1, when the minimum size of an object that is to be detected is set as area 101, vehicle 101a may be detected, whereas vehicle 102a shown to have the size of area 102 may not be properly detected.

SUMMARY OF THE INVENTION

Accordingly, the present invention is directed to a method and apparatus for detecting an object using a perspective plane that substantially obviates one or more problems due to limitations and disadvantages of the related art.

An object of the present invention is to provide a method and apparatus for efficiently detecting and tracking a moving object within a background scene.

Particularly, if the background scene includes a perspective, another object of the present invention is to provide a method and apparatus for detecting and tracking a moving object by using the perspective included in the background scene.

Another object of the present invention is to provide a system comprising a method and apparatus for detecting a moving object.

A further object of the present invention is to provide a recording medium having an object detection method considering the perspective of the background scene programmed therein.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for detecting an object using a perspective plane includes determining a perspective plane for a background scene, and determining a moving object within the background scene based upon the determined perspective plane. The method may further include determining a minimum size for detecting an object within the determined perspective plane. Herein, when the minimum size for detecting an object is determined in a random position within the perspective plane, the minimum size may vary in correspondence with the determined perspective plane.

The method may further include, after detecting the object, detecting a movement of the object and displaying a detected result on a display screen. When determining a perspective plane for a background scene, four angular points configuring the perspective plane for the background scene may be determined by a user. Herein, among the four angular points configuring the perspective plane, a position of any one angular point may be freely varied regardless of positions of other angular points. Also, when determining a perspective plane for a background scene, an object moving vertically and horizontally within the background scene may be determined, and a perspective characteristic of the background scene may be studied, thereby automatically determining the perspective plane based upon the studied result. Herein, a filter for detecting an object may be determined based upon the determined minimum size.

In another aspect of the present invention, an apparatus for detecting an object using a perspective plane includes a display unit, an object detector, a filter adjustor, and a controller. The display unit provides a background scene. The object detector detects a moving object within the background scene displayed on a display screen. The filter adjustor determines a filter size and provides the determined filter size to the object detector. And, the controller performs a control function of determining a perspective plane for the background scene and also controls the filter size of the filter adjustor based upon the determined perspective plane.

Herein, the controller may control the filter adjustor so that the minimum size for detecting an object can be set-up within the determined perspective plane. When the minimum size for detecting an object is determined in a random position within the perspective plane, the minimum size may vary in correspondence with the determined perspective plane. After detecting the object, the object detector may detect a movement of the object and may be controlled so as to display a detected result within the background scene being displayed on a display screen.

The controller may provide a user interface (UI) through the display unit and may perform a control function enabling the perspective plane and minimum size for detecting an object to be determined. Herein, in order to determine the perspective plane within a background scene being displayed, the controller may provide a user interface (UI) for determining four angular points configuring the perspective plane within the background scene being displayed. The user interface may be provided so that, among the four angular points configuring the perspective plane, a position of any one angular point can be freely varied regardless of positions of other angular points.

The apparatus for detecting an object using a perspective plane further includes a background scene study unit. Herein, in order to determine the perspective plane within the background scene being displayed, the controller may detect an object moving vertically and horizontally within the background scene, may control the background scene study unit so as to study a perspective characteristic of the background scene, and may perform a control function automatically determining the perspective plane based upon the studied result. The apparatus further includes a communicating means communicating with an external apparatus for acquiring an image providing the background scene and a moving object.

In a further aspect of the present invention, in detecting a moving object within a background scene through a recording medium having computer-readable data and program stored therein, the recording medium having a program for detecting an object using a perspective plane stored therein includes a first program determining a perspective plane for the background scene, a second program determining a moving object within the background scene based upon the determined perspective plane, and a third program displaying the detected result.

Herein, the first program may include a user interface (UI), and the first program may be programmed to determine the perspective plane and a minimum size for detecting an object through the user interface. Also, the first program may be programmed to detect an object moving vertically and horizontally within the background scene, to study a perspective characteristic of the background scene, and to automatically determine the perspective plane based upon the studied result.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
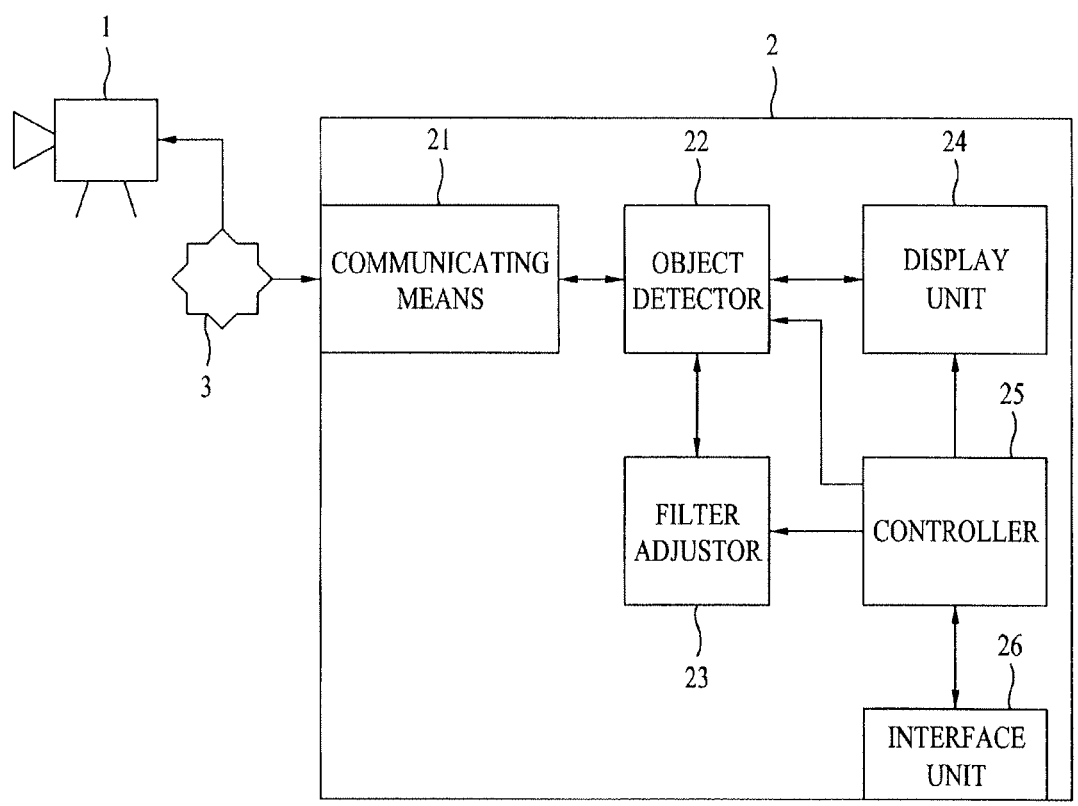
FIG. 2 illustrates a block view showing a general system structure of a visual surveillance device according to an embodiment of the present invention.

FIG. 2 illustrates a block view showing a general system structure of a visual surveillance device according to an embodiment of the present invention. The system broadly consists of an apparatus for acquiring images 1, an apparatus for detecting objects 2, and a telecommunications network 3. However, this is merely exemplary. Therefore, it is apparent that the apparatus for acquiring images 1 may be included in the apparatus for detecting objects 2.

Figure 1:
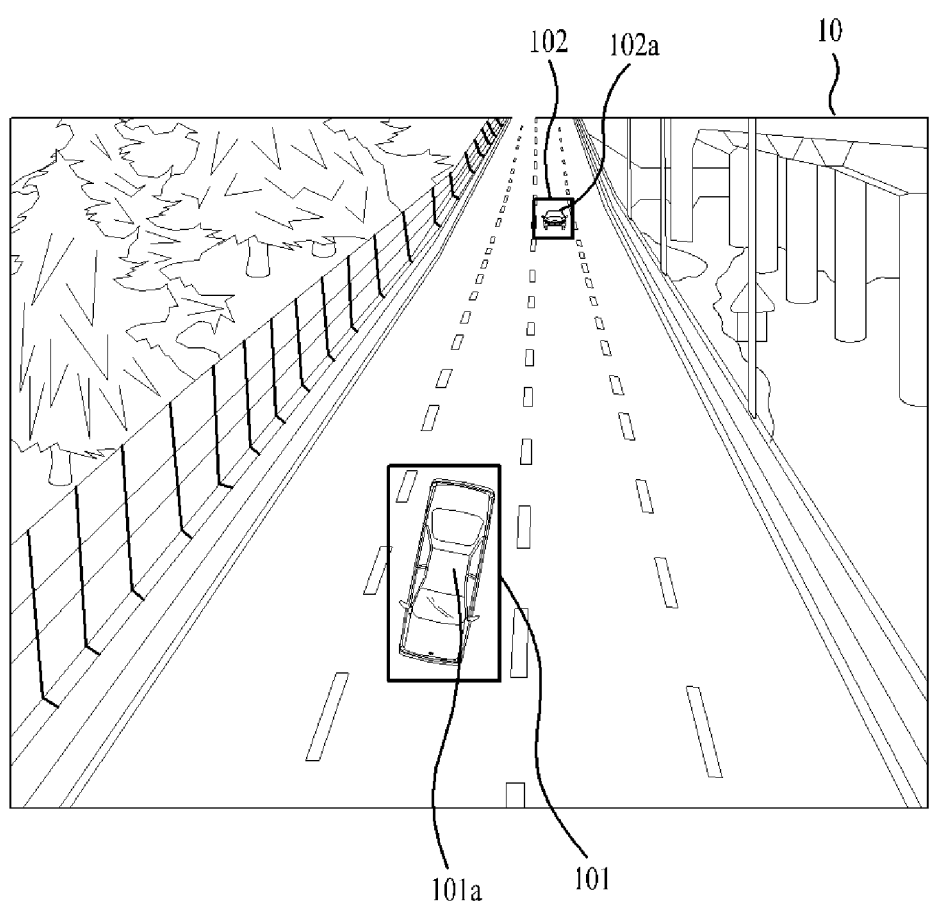
FIG. 1 illustrates an exemplary background scene obtained by a visual surveillance device.

For example, the apparatus for acquiring images 1 may correspond to a camera that films visual content (or images) (hereinafter, the term 'camera' will refer to the apparatus for acquiring images 1). More specifically, the camera may be placed in a desired location in a fixed or non-fixed form. When a stationary camera is placed in a fixed form, the scene of an identical location is filmed without alteration. And, when a camera is placed in a non-fixed form, the camera may be set-up in a rotating mode. If the camera is a rotating camera, the camera may film a specific area while rotating at a predetermined angle range. For example, if the predetermined rotation angle is 30 degrees (30°), a total of 12 background scenes may exist. Therefore, the technical spirit and scope of the present invention may be applied to both fixed and non-fixed (e.g., rotating type) cameras. Furthermore, although it is shown in FIG. 1 that only one camera is used, it is apparent that multiple cameras may be used by being connected to the apparatus for acquiring images through the telecommunications network 3.

As described above, in an embodiment where the apparatus for acquiring images 1 and the apparatus for detecting objects 2 are separately provided, the telecommunications network 3 refers to a network transferring data to and from the apparatus for acquiring images 1 and the apparatus for detecting objects 2. Herein, both wireless or wired telecommunications network 3 may be used, e.g., a wired telecommunications network and a wireless telecommunications network both connected to the internet may be used. Nevertheless, in a structure where the apparatus for acquiring images 1 is included in the apparatus for detecting objects 2, the telecommunications network 3 may be omitted from the system structure.

Accordingly, regardless of the term, diverse products may be applied as the apparatus for detecting objects 2. For example, devices that are broadly used, such as personal computers (PCs), TV receivers, mobile (or cellular) phones, and so on may all correspond to the apparatus for detecting objects 2. More specifically, the apparatus for detecting objects 2 may includes a communicating means 21, an object detector 22, a filter adjustor 23, a display unit 24, a controller 25, and an interface unit 26. More specifically, among the above-mentioned elements, the object detector 22, the filter adjustor 23, and the controller 25 may also be implemented in the form of software, instead of hardware.

Accordingly, such elements may be provided through a recording medium (e.g., ROM), which stores software programs. For example, programs stored in the recording medium may include a first program for predetermining a perspective place for a background scene, a second program for detecting a moving object within the background scene, based upon the predetermined perspective plane, and a third program displaying the detected result. Herein, the first program includes a user interface, which is programmed so that the user may use the user interface to predetermine the perspective plane and a minimum size for an object that is to be detected. Furthermore, the first program is programmed to detect an object moving horizontally and/or vertically in order to study and analyze the perspective characteristics of the background scene, thereby automatically determining the perspective plane based upon the analyzed result.

Hereinafter, each element of the apparatus for detecting objects 2 will now be described in detail. The communicating means 21 refers to a wired/wireless communicating means that communicates within the telecommunications network 3. Accordingly, the communicating means 21 receives the image acquired from the apparatus for acquiring images 1 and transmits the received image to the object detector 22. The display unit 24 comprises a display screen providing a visual screen to the user. Herein, the display unit 24 may correspond to diverse displaying means, such as LCD, LED, and so on. Particularly, the display unit 24 displays the object detected by the object detector 22 from the image acquired, which is by the apparatus for acquiring images 1, and also displays the result of tracking the detected object.

The interface unit 26 is provided to perform interaction with the user. For example, a keyboard module, a remote controller module, a mouse module, and so on may correspond to the interface unit 26. Herein, the system receives a user command via the interface unit 26. Thereafter, the execution of the received command is displayed to the display screen. Particularly, by using diverse UI screens through a 'UI' technology referred to as a user interface (UI), interaction with the user may be realized through various types of UI screens.

Also, the controller 25 controls all elements within the apparatus for detecting objects 2. Particularly, the controller 25 performs a function of detecting an object in accordance with the perspective characteristic of the background screen. The operations of the controller 25 will be described in detail in a later process. The object detector 22 analyzes the video image received from the apparatus for acquiring images 1, thereby detecting and tracking a moving object within the background screen according to a predetermined control procedure. Furthermore, the filter adjustor 23 provides information on the minimum size for object detection to the object detector 22, wherein the minimum size information in used as a reference standard for detecting an object under surveillance.

Accordingly, the minimum size for object detection is decided while taking into consideration the perspective characteristics of the background screen. This will be described in detail with reference to FIG. 3 to FIG. 7. More specifically, FIG. 3 to FIG. 5*b* respectively describe a method for detecting an object according to an embodiment of the present invention. And, FIG. 6 and FIG. 7 respectively describe a method for detecting an object according to another embodiment of the present invention.

Figure 3:
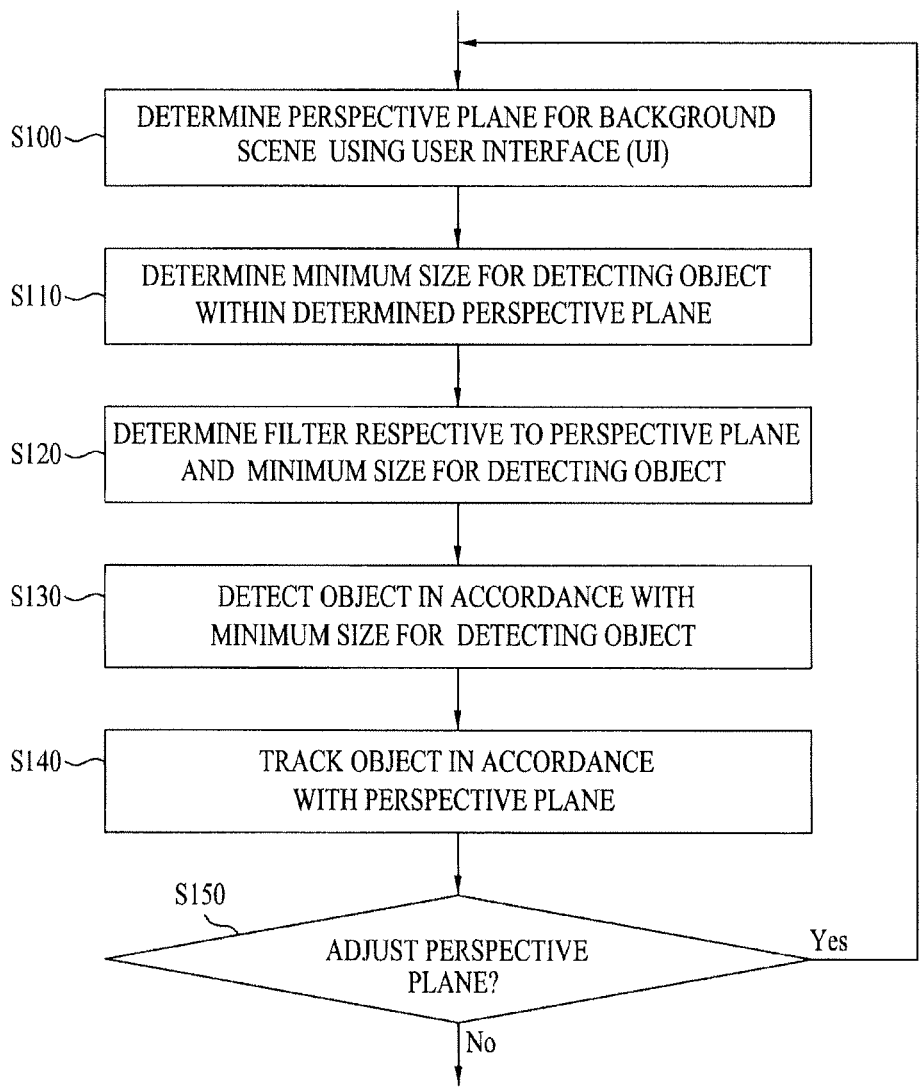
FIG. 3 illustrates a flow chart showing the process steps of a method for detecting an object according to an embodiment of the present invention.
Figure 5A:
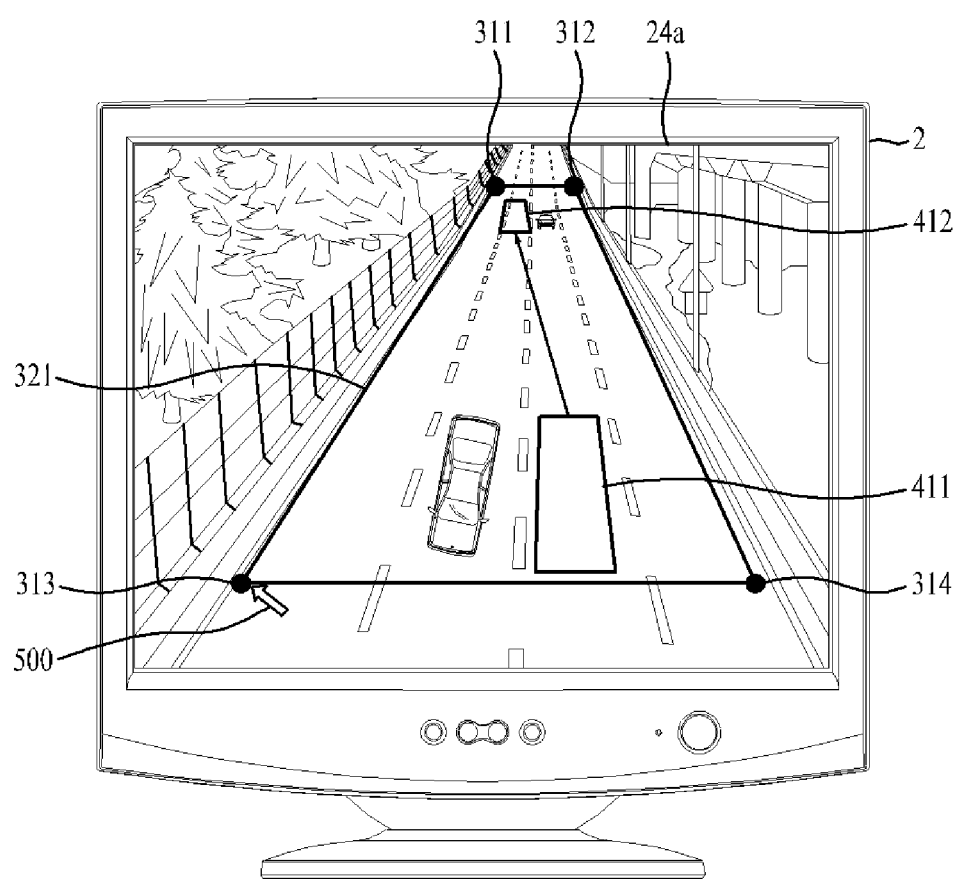
FIG. 5a and FIG. 5b illustrate an example of determining a perspective plane according to the embodiment of the present invention.

Hereinafter, the description of the first embodiment of the present invention will focus on the flow chart shown in FIG. 3. When a background scene being provided through the apparatus for acquiring images 1 is decided, a perspective plane considering the perspective characteristics of the background scene is predetermined S100. Also, the minimum size for detecting an object within the predetermined background scene determined S110. Accordingly, FIG. 5*a* illustrates a detailed method for determining a perspective plane and a minimum size for object detection within the background scene according to the first embodiment of the present invention. Herein, the user verifies the perspective characteristics of the background scene 24*a* through the display screen, thereby determining the perspective plane for detecting an object. The method for determining the perspective plane is performed by marking four angular points 311, 312, 313, and 314 that configure the perspective plane. More specifically, the perspective plane of the background scene is automatically determined by the segments 321 connecting the four marked angular points 311, 312, 313, and 314.

Figure 5B:
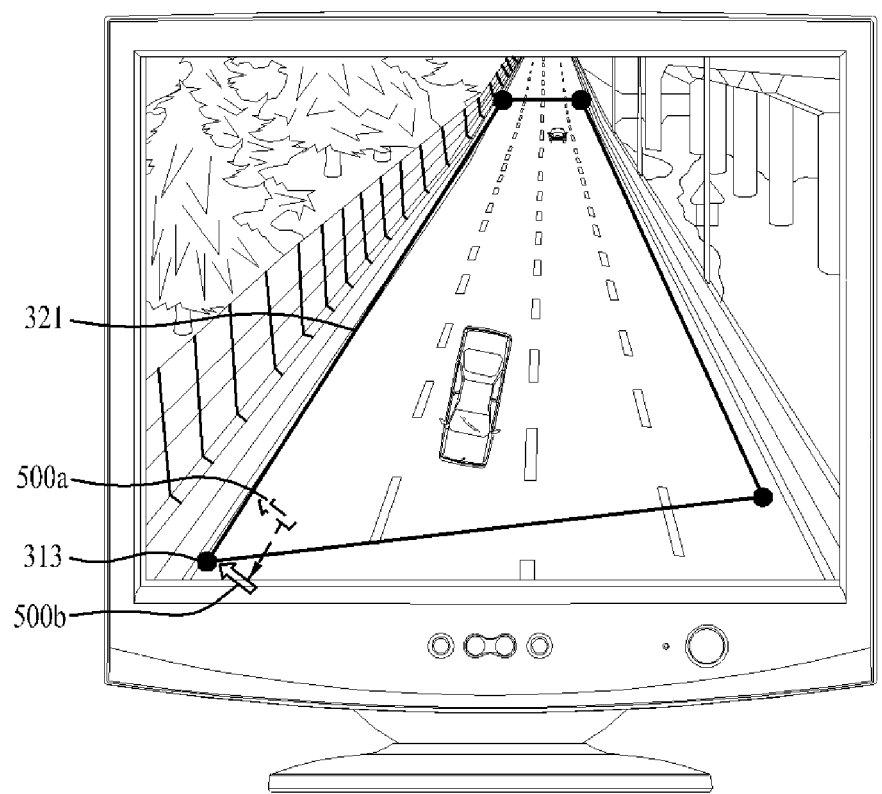

FIG. 5*b* illustrates an example of adjusting the determined perspective plane. For example, among the four angular points 311, 312, 313, and 314, by designating one angular point 313 as a click icon 500*a* and 500*b*, and by moving the designated angular point 313 to a desired position, the shape of the determined perspective plane is automatically altered. The method for altering the perspective plane may be identically applied to the remaining angular points 311, 312, and 314. Thus, the user may be able to efficiently and easily determine a desired perspective plane.

After determining the perspective plane, as described above, the minimum size for detecting an object is determined. For example, when it is assumed that the perspective plane has been determined as shown in FIG. 5*a*, the user determines the minimum size for detecting an object at a random position within the perspective plane 321. For example, when the user determines the minimum size for detecting an object 411 at a lower portion of the background scene, the minimum size 411 is also altered in connection to the perspective plane 321. For example, the minimum size 411 determined on the lower portion of the background scene is reduced to a smaller minimum size 412 at an upper portion of the background scene. Similarly, if the initial minimum size for detecting an object is determined in area 412, which is positioned at the upper portion of the background scene, the minimum size may be enlarged to a larger minimum size corresponding to area 411 at the lower portion of the background scene. In other words, once a minimum size for detecting an object is determined at a random position within the perspective plane, the corresponding minimum size is either reduced or enlarged in accordance with the perspective plane. More specifically, as described above, as the minimum size 411 and 412 for detecting an object is automatically reduced or enlarged in accordance with the determined perspective plane 321, a moving object within the perspective plane 321 may be efficiently detected.

Figure 4:
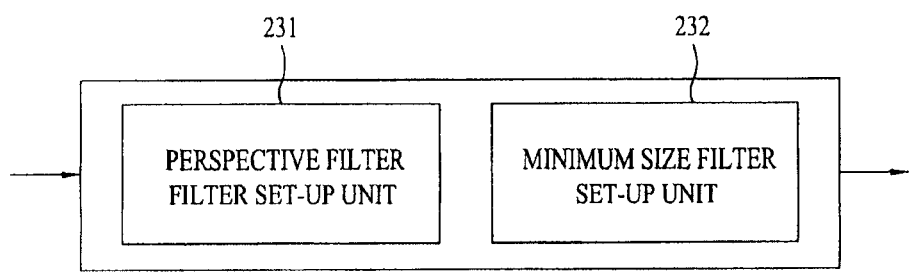
FIG. 4 illustrates a block view showing a detailed structure of the object detector according to the embodiment of the present invention.

After determining the perspective plane and minimum size for detecting an object, in step 100 and step 110, a filter value respective to the determined perspective plane and minimum size for detecting an object is determined S120. FIG. 4 illustrates a detailed structure of a filter adjustor 23 according to the embodiment of the present invention. More specifically, when the perspective plane 321 is determined as described above, the filter adjustor 23 is configured by including a perspective filter set-up unit 231 and a minimum size filter set-up unit 232. Herein, the perspective filter set-up unit 231 determines and set-up a perspective filter based upon a respective control signal of the controller 25. And, the minimum size filter set-up unit 232 determines a minimum size for detecting an object 411 and 412 in accordance with the perspective plane 321 based upon a respective control signal of the controller 25. As described above, the perspective filter set-up unit 231 and the minimum size filter set-up unit 232 may also be implemented in the form of software programs.

Subsequently, depending upon the determined perspective plane and minimum size for detecting an object, a moving object is detected within the background screen S130. Then, based upon the characteristics of the determined perspective plane, the movement of the detected object within the background scene is tracked S140. Also, if the user wishes to adjust the determined perspective plane S150, step 100 is repeated, thereby adjusting the perspective plane in accordance with FIG. 5a and FIG. 5b, as described above.

Hereinafter, the second embodiment of the present invention will be described in detail with reference to FIG. 6 to FIG. 7. As compared to the above-described first embodiment of the present invention, the method for determining the perspective plane according to the second embodiment of the present invention corresponds to an automatic set-up method performed by the system.

When a background scene being provided through the apparatus for acquiring images 1 is decided, a perspective plane considering the perspective characteristics of the background scene is predetermined S200. According to the second embodiment of the present invention, the perspective plane is determined through analysis or study based upon the control of the controller 25. This method is different from the above described method according to the first embodiment of the present invention wherein the user directly determined the perspective plane, as shown in FIG. 3. More specifically, when the background scene is determined, the controller 25 uses the object detector 22 to determine the size of a moving object that is detected from the upper/lower portion and/or left/right side of the background scene. Particularly, for example, after studying how the size of the object detected in the upper portion (or lower portion) of the background scene changes in the lower portion (or upper portion), the studied result is used to set-up the perspective plane of the background scene. Similarly, after studying how the size of the object detected in the left side (or right side) of the background scene changes in the right side (or left side), the studied result may also be used to set-up the perspective plane of the background scene. More specifically, when a study of how the overall size of the object changes at least in the up-down (or vertical) and left-right (or horizontal) directions according to the perspective characteristics within the background scene is performed, the perspective plane of the background scene may be automatically determined based upon the studied result.

Thereafter, along with the automatic settings of the perspective plane, the minimum size of the object may also be automatically determined S210. Once the perspective characteristics of the background scene is automatically studied in step 200, an automatic study of the minimum size for detecting an object in accordance with the perspective characteristics may also be performed, thereby enabling the minimum size for detecting an object to be automatically determined based upon the studied result.

However, the minimum size setting of step 210 is not necessarily set-up automatically by the system. The minimum size setting of step 210 may also be determined by the user through a user interface (UI). In this case, when the perspective place determined in step 200 is displayed in the background scene, the user uses the perspective plane determined by the system, so as to personally set-up the minimum size for detecting an object.

Alternatively, in another example, when the perspective plane automatically determined by the controller 25 in step 200 is displayed in the background scene, the user may directly adjust the perspective plane in a later process S250 (shown as a dotted line in FIG. 6). At this point, the above-described method of FIG. 5b may be used for the adjustment of the perspective plane made by the user. Eventually, the adjustment of the automatically determined perspective plane may be performed after detecting and tracking the object S230 and S240. In other words, either the adjustment may be performed based upon the detected and tracked result S250 (shown as a solid line in FIG. 6), or the adjustment may be performed by the user prior to detecting the object and after verifying the automatic set-up result of the perspective plane S250 (shown as a dotted line in FIG. 6).

After determining the perspective plane and the minimum size for detecting an object in step 200 and step 210, a filter value respective to the determined perspective plane and minimum size for detecting an object is determined S220. Then, a moving object is detected in the background scene based upon the determined perspective plane and minimum size for detecting an object S230. And, subsequently, based upon the determined perspective characteristics, the movement of the object detected in the background scene is tracked S240.

Thereafter, when the user wishes to adjust the automatically determined perspective plane S250, the adjustment method is first selected. For example, the user selects whether the adjustment of the perspective plane is to be performed by the user himself/herself through a user interface (UI), or whether the adjustment of the perspective plane is to be automatically performed by the system through a repeated study S260. In case the user selects to personally adjust the perspective plane, the user directly determines the perspective plane within the background scene S270 according to the method shown in FIG. 5a and FIG. 5b. Then, step 210 to step 240 are repeated. And, particularly, it is preferable that, in step 210, the setting of the minimum size for detecting an object is directly determined by the user and not through an automatic setting performed by the system. Also, in case the user selects to have the perspective plane adjusted by a repeated and constant study S250, the above described step 200 is repeated.

Figure 7:
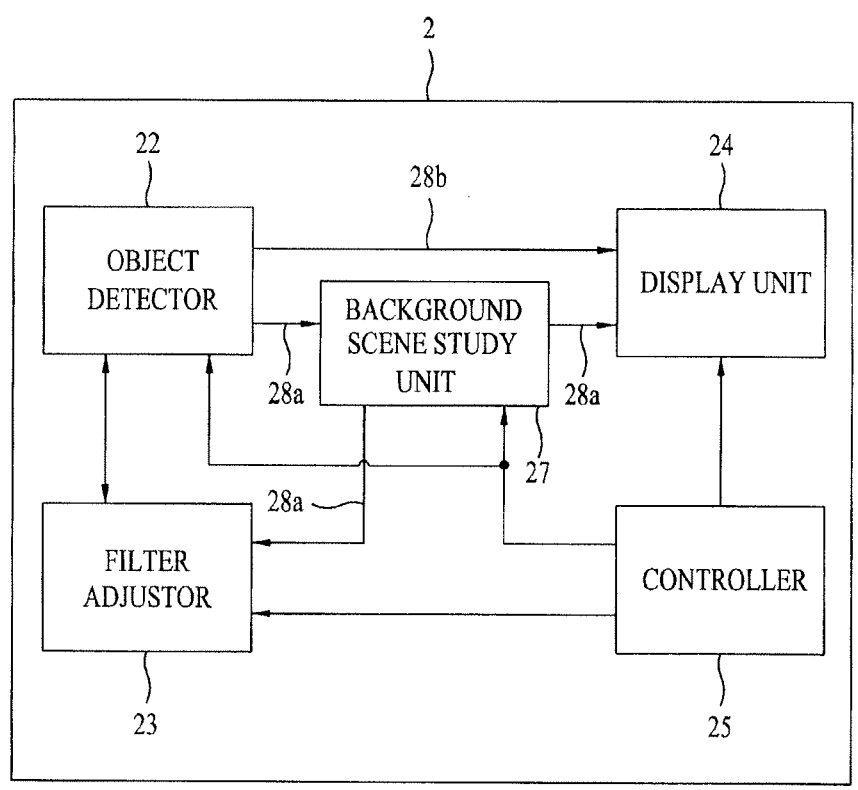
FIG. 7 illustrates a block view showing a detailed interior structure of an apparatus for detecting an object according the other embodiment of the present invention.

FIG. 7 illustrates a block view showing a detailed interior structure of an apparatus for detecting an object according the other embodiment of the present invention. In the structure of the apparatus for detecting an object shown in FIG. 7, an object detector 22, a filter adjustor 23, and a display unit 24 are similar to those included in the structure shown in FIG. 2. However, the structure of FIG. 7 further includes a background scene study unit 27 (or also referred to as a 'perspective characteristic detecting unit') for determining the perspective plane within the background scene.

Figure 6:
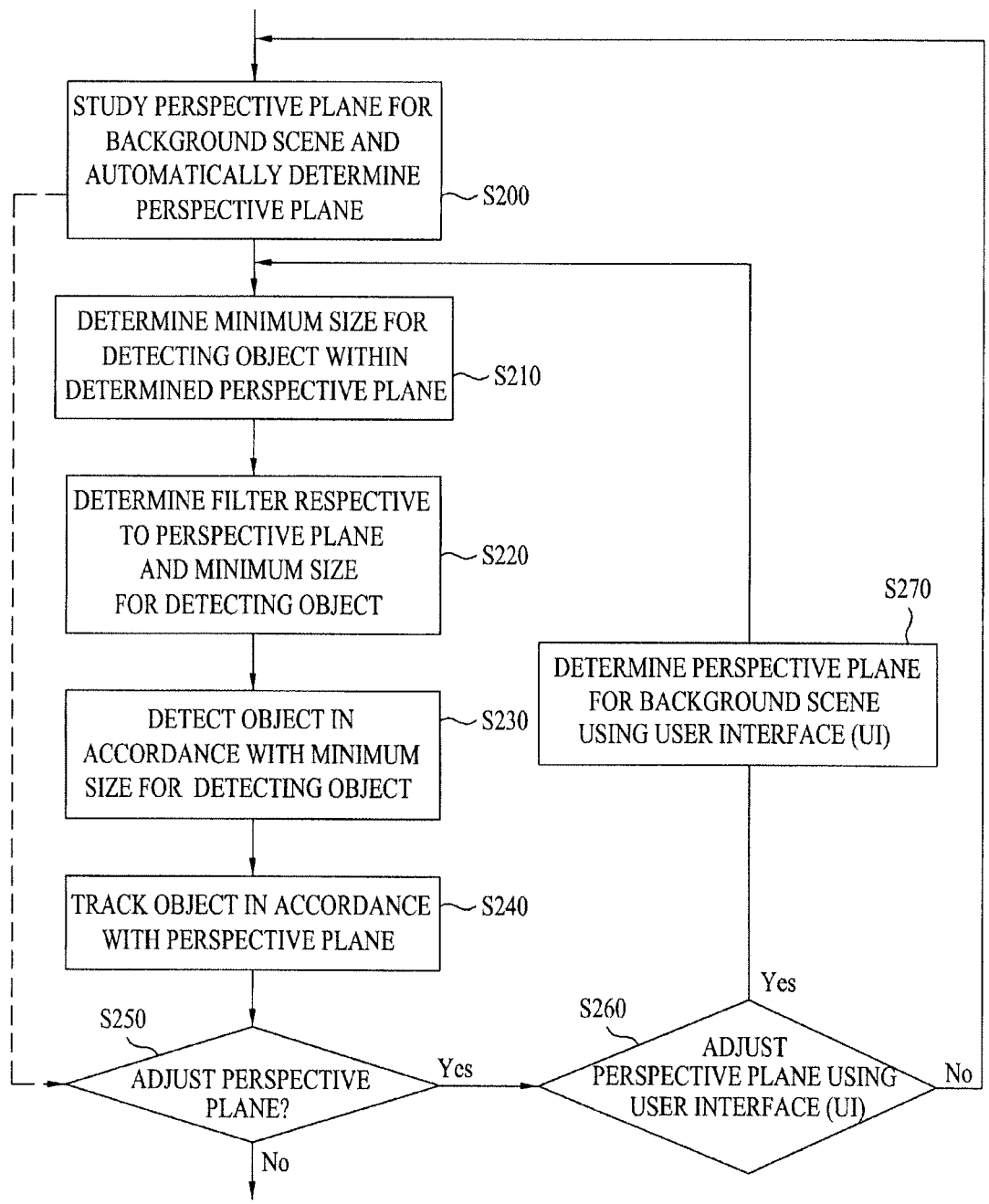
FIG. 6 illustrates a flow chart showing the process steps of a method for detecting an object according to another embodiment of the present invention.

More specifically, as described in FIG. 6, the perspective plane of the background scene is decided by the object detector 22 and the background scene study unit 27 based upon the control of the controller 25. Therefore, prior to determining the perspective plane, the object detected by the object detector 22 is delivered to the background scene study unit 27 along line 28a, and a perspective filter value according to the automatically determined perspective plane is adjusted by the filter adjustor 23. Conversely, after the perspective plane is determined, the object detected by the object detector 22 is delivered to the display unit 24 along line 28b. Furthermore, the result of the background scene study unit 27 may also be displayed to the display unit 28 through line 28a.

Figure 8A:
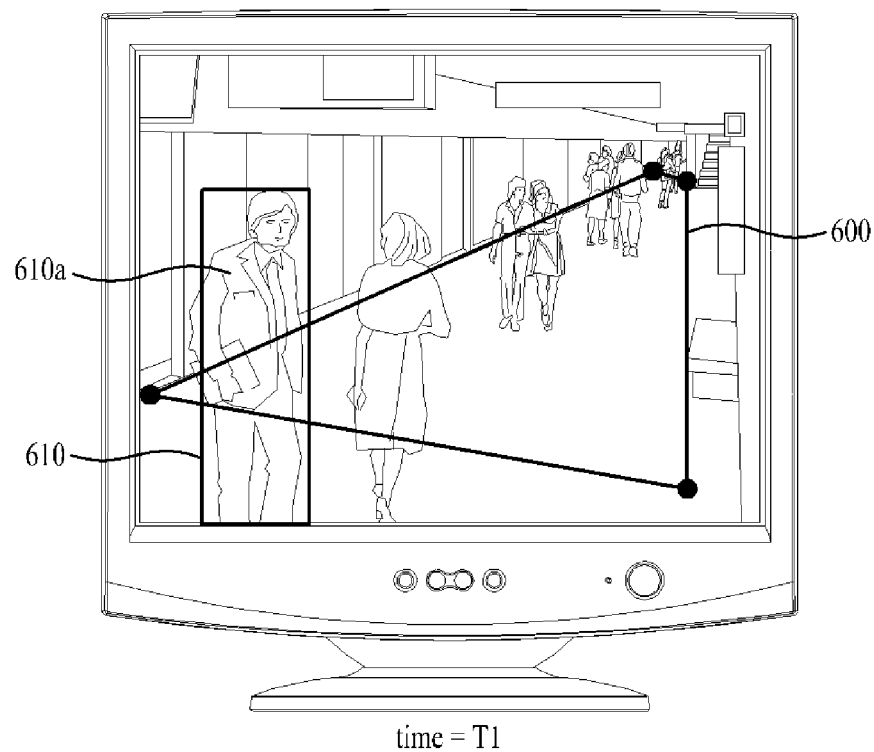
FIG. 8a and FIG. 8b illustrate an example of detecting and tracking a moving object from a background scene having a perspective plane predetermined therein according to the embodiment of the present invention.
Figure 8B:
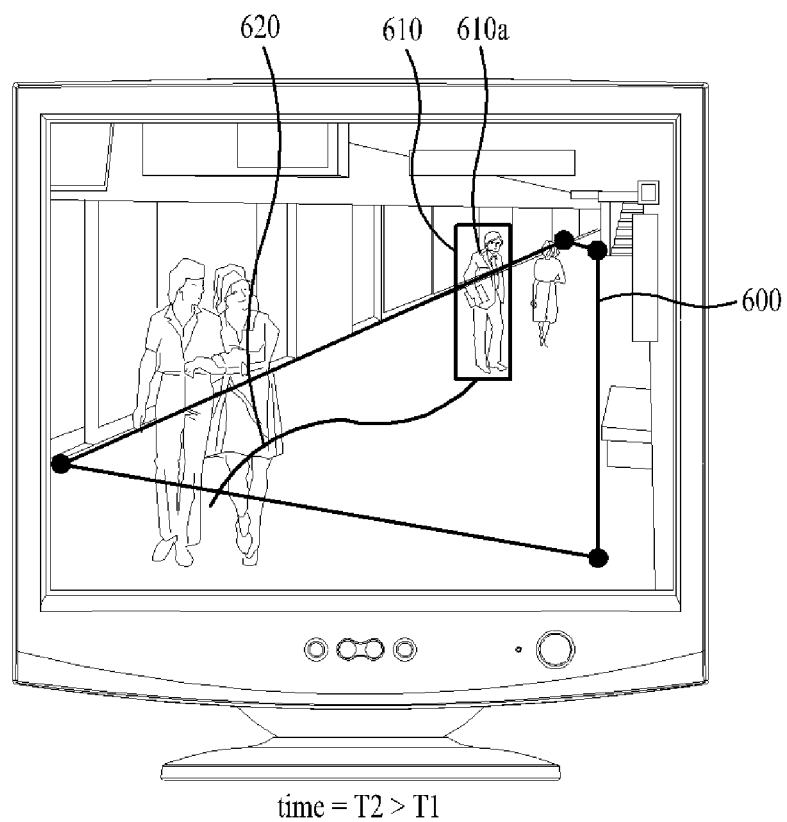

FIG. 8a and FIG. 8b illustrate an example of detecting and tracking a moving object from a background scene having a perspective plane predetermined therein according to the embodiment of the present invention. For simplicity of the description, FIG. 8a illustrates a background scene taken at a specific time T1. And, FIG. 8b illustrates a background scene taken at a time T2 after a predetermined time lapse (wherein T2>T1).

For example, referring to T1 of FIG. 8a, when a perspective plane 600 is at least determined for the background scene, and when a minimum size for detecting an object (not shown) is also determined, once a specific object 610a is detected at the lower portion of the background scene, the detected object is displayed on the screen through an object recognition box 610. Thereafter, the path 620 along which the detected object 610a moves is tracked. Herein, in FIG. 8a and FIG. 8b, only one object 610a is shown as an example for simplicity. However, it is apparent that in the actual application of the present invention, all moving objects within the background scene may be provided to the user through an object recognition box 610 and a movement path recognition box 620, so that the user can verify the movement of all detected objects.

As described above, the method and apparatus for detecting an object using a perspective plane according to the present invention have the following advantages. By using a visual surveillance device and an apparatus for detecting objects, the present invention is capable of efficiently detecting objects and tracking the movements of the corresponding objects.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for detecting an object using a perspective plane, comprising:
    determining a perspective plane for a background scene;
    determining a first minimum size for detecting an object at a reference position within the perspective plane;
    determining a second minimum size at a second position within the perspective plane, the second minimum size being based on the first minimum size at the reference position and the relationship between the reference position and the second position with respect to the perspective plane; and
    detecting a moving object within the background scene based upon the determined perspective plane and the first minimum size and second minimum size.

2. The method of claim 1, further comprising:
    after detecting the object, detecting a movement of the object and displaying a detected result on a display screen.

3. The method of claim 1, wherein, when determining a perspective plane for a background scene, four angular points configuring the perspective plane for the background scene are determined by a user.

4. The method of claim 3, wherein, among the four angular points configuring the perspective plane, a position of any one angular point can be freely varied regardless of positions of other angular points.

5. The method of claim 1, wherein, when determining a perspective plane for a background scene, a perspective characteristic of the background scene is studied, thereby automatically determining the perspective plane based upon the studied result.

6. An apparatus for detecting an object using a perspective plane, comprising:
    a display unit configured to provide a background scene;
    an object detector configured to detect a moving object within the background scene displayed on a display screen;
    a filter adjustor configured to determine a filter size and configured to provide the determined filter size to the object detector; and
    a controller configured to perform a control function of determining a perspective plane for the background scene, and configured to control the filter size of the filter adjustor based upon the determined perspective plane,
    wherein the controller is configured to determine a first minimum size for detecting an object at a reference position within the perspective plane, and to determine a second minimum size at a second position within the perspective plane, the second minimum size being based on the first minimum size at the reference position and the relationship between the reference position and the second position with respect to the perspective plane, and
    wherein the object detector is configured to detect a moving object based on the perspective plane, the first minimum size, and second minimum size.

7. The apparatus of claim 6, wherein, after detecting the object, the object detector is configured to detect a movement of the object and is configured to be controlled so as to display a detected result within the background scene being displayed on a display screen.

8. The apparatus of claim 6, wherein the controller is configured to provide a user interface (UI) through the display unit and is configured to perform a control function enabling the perspective plane and minimum size for detecting an object to be determined.

9. The apparatus of claim 8, wherein, in order to determine the perspective plane within a background scene being displayed, the controller is configured to provide a user interface (UI) for determining four angular points configuring the perspective plane within the background scene being displayed.

10. The apparatus of claim 9, wherein the user interface is provided so that, among the four angular points configuring the perspective plane, a position of any one angular point can be freely varied regardless of positions of other angular points.

11. The apparatus of claim 6, further comprising a background scene study unit, and wherein, in order to determine the perspective plane within the background scene being displayed, the controller is configured to control the background scene study unit so as to study a perspective characteristic of the background scene, and is configured to perform a control function automatically determining the perspective plane based upon the studied result.

12. The apparatus of claim 6, further comprising:
a communicating means configured to communicate with an external apparatus for acquiring an image providing the background scene and a moving object.

13. A non-transitory recording medium having computer-readable data and program stored therein, the recording medium having code for detecting an object using a perspective plane stored therein, the code comprising:
a first code configured to determine a perspective plane for a background scene;
a second code configured to determine a first minimum size for detecting an object at a reference position within the perspective plane;
a third code configured to determine a second minimum size at a second position within the perspective plane, the second minimum size being based on the first minimum size at the reference position and the relationship between the reference position and the second position with respect to the perspective plane; and
a fourth code configured to detect a moving object within the background scene based upon the determined perspective plane and the first minimum size and second minimum size.

14. The non-transitory recording medium of claim 13, wherein the first code is configured to includes a user interface (UI), and wherein the first code is configured to determine the perspective plane and the first minimum size for detecting an object through the user interface.

15. The non-transitory recording medium of claim 13, wherein the first code is configured to study a perspective characteristic of the background scene, and to automatically determine the perspective plane based upon the studied result.

16. The method of claim 1, wherein determining the second minimum size is done automatically, without human intervention or input.

* * * * *